United States Patent [19]

Kirsch et al.

[11] Patent Number: 5,828,897

[45] Date of Patent: Oct. 27, 1998

[54] HYBRID PROCESSOR AND METHOD FOR EXECUTING INCREMENTALLY UPGRADED SOFTWARE

[75] Inventors: Steven A. Kirsch, Agoura; Dwight J. Mellema, Pasadena, both of Calif.

[73] Assignee: Raytheon Company, Lexington, Mass.

[21] Appl. No.: 769,571

[22] Filed: Dec. 19, 1996

[51] Int. Cl.⁶ ........................................... G06F 9/34
[52] U.S. Cl. .................. 395/800.43; 395/800; 395/570; 395/568; 395/500
[58] Field of Search ...................... 395/500, 527, 395/200.43, 200.46, 20.48, 800.28, 800.29, 800.3, 386, 568, 712, 705, 800.43, 800.84, 570

[56] References Cited

U.S. PATENT DOCUMENTS

| | | | |
|---|---|---|---|
| 3,631,405 | 12/1971 | Hoff et al. | 395/385 |
| 4,654,779 | 3/1987 | Kato et al. | 711/147 |
| 4,951,195 | 8/1990 | Fogg, Jr. et al. | 395/500 |
| 5,077,657 | 12/1991 | Cooper et al. | 395/500 |
| 5,155,837 | 10/1992 | Liu et al. | 395/200.51 |
| 5,179,703 | 1/1993 | Evans | 395/703 |
| 5,359,730 | 10/1994 | Marron | 395/712 |
| 5,406,644 | 4/1995 | MacGregor | 395/500 |
| 5,414,845 | 5/1995 | Behm et al. | 395/674 |
| 5,636,366 | 6/1997 | Robinson et al. | 711/163 |

*Primary Examiner*—Larry D. Donaghue
*Attorney, Agent, or Firm*—Leonard A. Alkov; Glenn H. Lenzen, Jr.

[57] ABSTRACT

Computer apparatus having a first processor that runs legacy software implemented using a first instruction set, and a second processor that runs new or updated software using a second instruction set. An operand memory is coupled to the first and second processors and stores shared operands in a native representation of the first instruction set. The second instruction set has an extended address space which is used to permit access by the new or updated software to the shared operands. To achieve this, the second processor has a software-implemented object request broker and a reference repository that contains information regarding the location and format of shared operands. When the new or updated software needs access to a shared operand in the operand memory, the nor or updated software invokes an object adapter for the type of operand being accessed, which in turn invokes the object request broker in order to obtain information from the reference repository, enabling the object adapter to locate and reformat the shared operand 24 as required by the new or updated application software. Methods that permit access to shared operands by the software that runs on both processors are also disclosed.

4 Claims, 3 Drawing Sheets

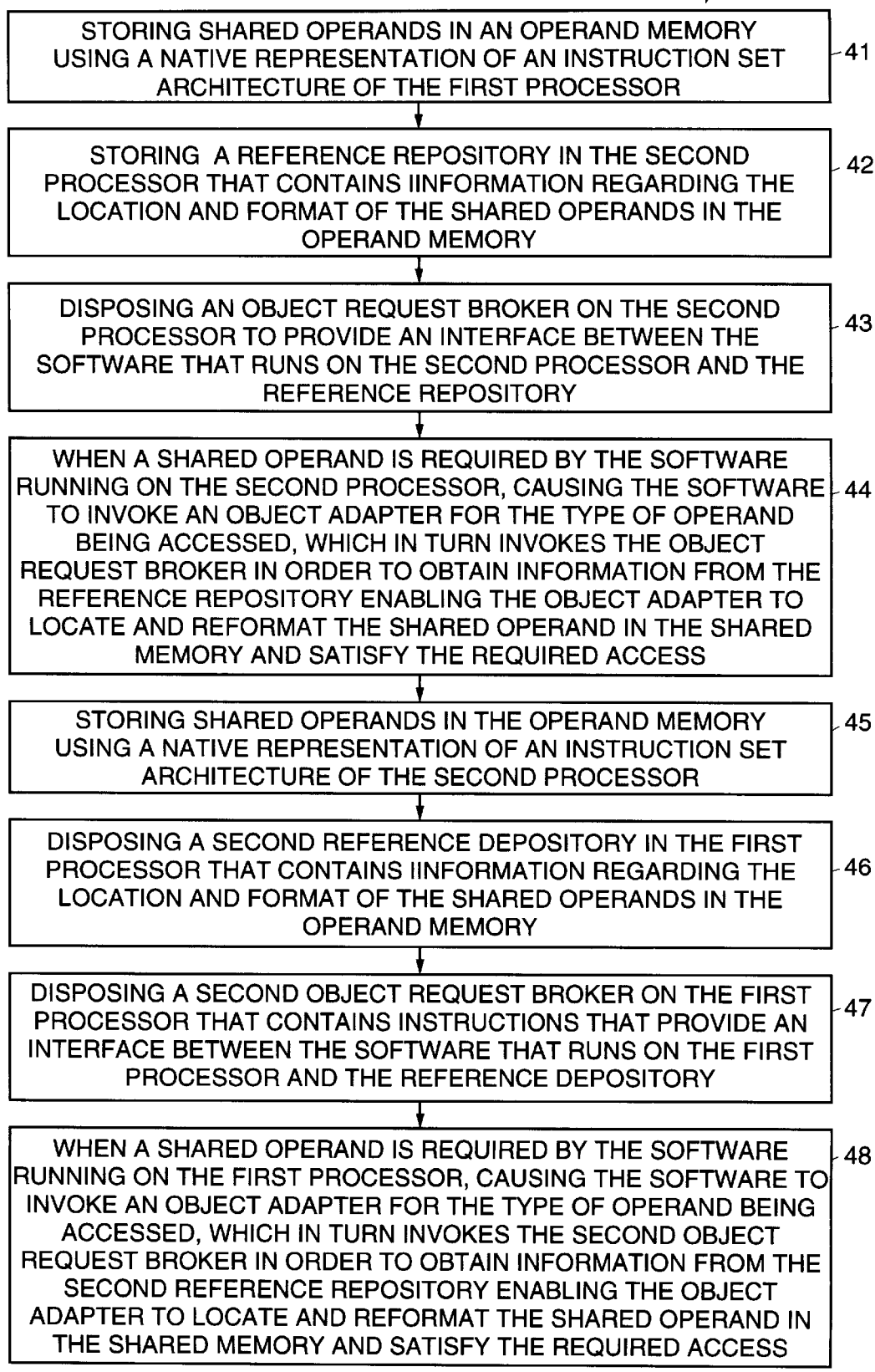

HYBRID PROCESSOR AND METHOD FOR EXECUTING INCREMENTALLY UPGRADED SOFTWARE

BACKGROUND

The present invention relates generally to digital processing systems and methods, and more particularly, to a hybrid digital processing system and methods that may be used to execute incrementally upgraded software.

Due to reduced Department of Defense (DoD) budgets, the service life of existing avionics platforms has been extended. At the same time, new mission requirements and supportability and obsolescence issues have created a need to upgrade existing avionics subsystems used on these platforms. However, the cost of developing and revalidating the avionics software involved in these upgrades has frequently been a serious obstacle to the viability of proposed upgrades.

More specifically, the assignee of the present invention designs and manufactures avionics subsystems such as the F-15 and F/A-18 radar systems, for example, and has been seeking an upgrade approach that would allow the use of newly developed 32-bit processors to replace existing 16-bit DoD-STD-1750A processors, and to use the Ada programming language in place of the existing JOVIAL programming language. Until the present invention, the anticipated initial cost of the software redevelopment and revalidation has precluded such an upgrade. It would therefore be beneficial to have means for providing processor upgrades for existing avionics systems, and the like, that provides a cost-effective upgrade approach that greatly reduces the software redevelopment and revalidation costs.

Furthermore, there are numerous existing avionics subsystems in use today for which the digital processing is hosted on 16-bit instruction set architecture processors, such as 1750A and AYK-14 processors, for example, and that are programmed in older languages such as JOVIAL and CMS-2. A number of these subsystems are still in production and are expected to be in use for many years, requiring a substantial amount of software maintenance until they are finally decommissioned. In some cases, performance upgrades may also be desired that involves reprogramming of the software.

If these subsystems had been developed using software engineering constructs of the Ada language, the projected cost of software maintenance would be considerably reduced. Furthermore, if these subsystems had been implemented on processors with 32-bit instruction set architectures, they would be better suited to use of the Ada language and would potentially have the throughput and memory capacity to facilitate the desired performance upgrades.

Unfortunately, the cost to transition from an existing configuration to an Ada 32-bit instruction set architecture configuration is substantial. The nonrecurring development cost for a new processor and a new Ada Operational Flight Program (OFP) could be considerable, but dominating these development costs is the cost of the flight testing required to requalify a subsystem with an entire new processor and OFP.

To illustrate this point, consider the following hypothetical scenario. Assume that an airborne sensor subsystem can be upgraded by inserting a 32-bit processor board into a spare slot, and assume that the processor board has already been developed. If the subsystem is still in production, this could be economically accomplished as a block change by means of a backplane wiring change. Retrofitting this change into existing line replaceable units could also be relatively inexpensive, depending on the extent of change required for the backplane.

Further assume that there is a code translator that can convert the existing OFP into Ada at minimal expense and that there is a software reengineering and restructuring tool that can convert the translated Ada code into well-structured Ada code also at minimal expense. The total cost of these changes might be very attractive along with the potential cost savings provided by future software maintenance in the Ada language.

Unfortunately, the cost of flight test requalification of the translated and rehosted OFP is likely to be far greater than any of the development costs discussed above. Thus, when this additional cost is taken into account, the projected maintenance cost savings may no longer be sufficient to justify the investment. Consequently, an alternative approach is required, one that does not require changing and requalifying the entire OFP in a single step.

Current practice does not require an entire OFP requalification whenever an OFP change is made. The software maintenance process for avionics subsystems involves developing a modified OFP in which previous deficiencies are corrected and new functions and new modes of operation are added. The flight test qualification process for these modified OFPs is a far less comprehensive effort than is required for a new OFP. Only those functions that were modified in the OFP update are requalified in detail, and other functions are checked only in sufficient detail to ensure that they are not inadvertently changed. Many years of experience have established that this "mini-qualification" process is adequate for OFP maintenance releases.

This observation suggests that if a staged or evolutionary transition to the Ada language and 32-bit processing could be achieved, then the requalification could also be performed in stages. The benefits of using the Ada programming language could be achieved in stages, and there would not be any point at which an entire OFP requalification would be required. Moreover, if those stages were made to coincide with OFP maintenance releases, then the required mini-qualifications would be the same ones that would have normally been required. In other words, the new functions and operational modes developed for the planned OFP maintenance release would be implemented in the Ada programming language and hosted on the new processor, while the remainder of the OFP remained in the old language and would be run on the old processor. The cost of flight test qualification would be about the same as if the OFP upgrade had been done entirely in the old language.

However, there is no assurance that the software architecture of the existing OFP would lend itself to this arrangement. New functions executing on a new and separate processor would have to interact with the old functions executing on the old processor. Data would have to be passed back and forth between the two processors, and synchronization mechanisms would be required to keep the entire system operating correctly. If old and new functions both shared a large "global" database, the amount of message passing required might introduce unacceptable latency in the processing. Unfortunately, for OFPs programmed in older languages, the use of such global data structures is not unusual.

There are three conventional methods of upgrading existing (legacy) software so that is will execute on a new processor, namely, translation and reengineering, emulation, and recompilation. The translation and reengineering method involves translating the legacy code to a new language and compiling it using a new compiler targeted to a new instruction set architecture of the target processor. Reengineering methods may be used along with a translator to produce translated code having a more modular, maintainable structure. The advantage of this method is that it recovers much of the original intellectual content of the legacy software while transforming it to a new language for use on the target processor. The disadvantage of this method is that there are numerous opportunities for errors to be introduced. These include errors introduced by the translation process, by a new compiler, by the restructuring process, by a new set of interfaces to a new operating system, and by subtle differences of a new instruction set architecture (such as differences in round-off properties, etc.). Because the chances of error are relatively great in the translation and reengineering method, it is necessary to perform a significant amount of flight test revalidation on the reengineered legacy code, thus seriously increasing the cost of the upgrade.

The emulation method involves executing the legacy object code using an emulator running on a high performance general-purpose microprocessor. This method recovers the intellectual content of the legacy software and avoids errors introduced by the translation process and by the use of a new compiler. However, there are still numerous opportunities for errors to be introduced by the emulation code, by side effects of running on top of a new operating system, and by subtle differences of the new instruction set architecture. It is also necessary to perform a significant amount of flight test revalidation on the legacy code, thus seriously increasing the cost of the upgrade. Moreover, the emulation approach does not offer a clear path for upgrading to a new programming language or of utilizing the full performance of the more advanced microprocessor by executing new code without emulation.

The recompiliation method involves keeping the legacy object code in its original programming language but recompiling it so that it can execute on a new target microprocessor. For most avionics upgrade applications, this method requires development of a new compiler in which the old programming language is targeted to the new instruction set architecture. The expense of developing and validating such a compiler is in itself a deterrent to implementing an upgrade. The recompilation method does retain the intellectual content of the legacy software source code and avoids errors introduced by the translation of the software into a new language. However, there are numerous opportunities for errors to be introduced by an immature compiler, as well as errors introduced by the side effects of running on top of a new operating system and by subtle differences associated with the new instruction set architecture. As in the two previous methods, it is necessary to perform a significant amount of flight test revalidation on the legacy code, thus creating significant additional cost for the upgrade. Also, the recompilation approach does not offer a clear path for upgrading to a new programming language with the associated software engineering benefits which a more modern language offers.

Accordingly, it is an objective of the present invention to provide for a hybrid digital processing system and methods for executing incrementally upgraded software that overcome the limitations of the above-described conventional approaches.

SUMMARY OF THE INVENTION

To meet the above and other objectives, the present invention provides for a hybrid digital processing system and method that allows a combination of legacy software and upgraded or new software to be executed together within an embedded avionics processor. If desired, the two types of software may execute on central processing units (CPUs) having different instruction set architectures and may be programmed in different programming languages. No changes are required to the existing legacy software to enable it to execute on the hybrid digital processing system. The hybrid digital processing system is based on a hardware architecture that allows tight coupling between the legacy software and the upgraded or new software through the use of shared memory. The hybrid digital processing system takes advantage of a software architecture that allows straightforward sharing of data objects through the use of a real-time object request broker.

More specifically, the hybrid digital processing system is comprised of a first processor that executes legacy software having a first instruction set architecture, and a second processor that executes new or updated software having a second instruction set architecture. An operand memory is coupled to the first and second processors and stores shared operands in a native representation of the instruction set architecture of the first processor. The second instruction set architecture has an extended address space which is used to permit access by the new or updated software to the shared operands in the operand memory. To take advantage of this, the second processor has a software-implemented object request broker and a reference repository that stores information regarding the location and format of variables in the shared memory which are used by the second processor. When the new or updated software needs access to a shared operand in the operand memory, the object broker utilizes the appropriate information in the reference repository to determine where the operand is located and how to convert its format into a representation which is usable in the second processor.

The present invention also provides for methods for use with a computer system containing first and second processors that run software that use different instruction sets. The method permits access to shared operands by the software that runs on both processors. The method embodies the following steps.

Shared operands are stored in an operand memory using a native representation of an instruction set architecture of the first processor. A reference repository stored in the second processor contains information which allow software executing in the second processor to access the shared operands in the operand memory. An object request broker is deployed on the second processor to provide an interface between the software that runs on the second processor and the reference repository. Then, when a shared operand is required by the software running on the second processor, the software is caused to access an appropriate sequence of instructions in the object request broker which makes use of the information stored in the reference depository corresponding to the requested shared operand. This action returns the requested shared operand from the operand memory for use by the software running on the second processor. The use of a symmetrically configured object request broker and reference depository on the first processor could optionally permit access to shared operands by the software on the first processor that are normally exclusive to the second processor.

The hybrid digital processing system is a unique approach that allows the existing software to be incorporated into an upgraded subsystem without change, thus eliminating the need for extensive redevelopment and revalidation of the existing software. At the same time the hybrid digital processing system creates a growth path for the upgraded subsystem, allowing it to migrate to a more advanced instruction set architecture and/or programming language. The migration can be incremental, as new functionality is incorporated into the software, thus enabling the initial software cost of the upgrade to be minimized. Furthermore, none of the opportunities for error discussed in the Background section regarding the prior art methodologies are present in the case of legacy software used on the hybrid digital processing system.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 3 is a flow diagram illustrating methods that permit access to shared operands by software running on different processors

DETAILED DESCRIPTION

Figure 1:
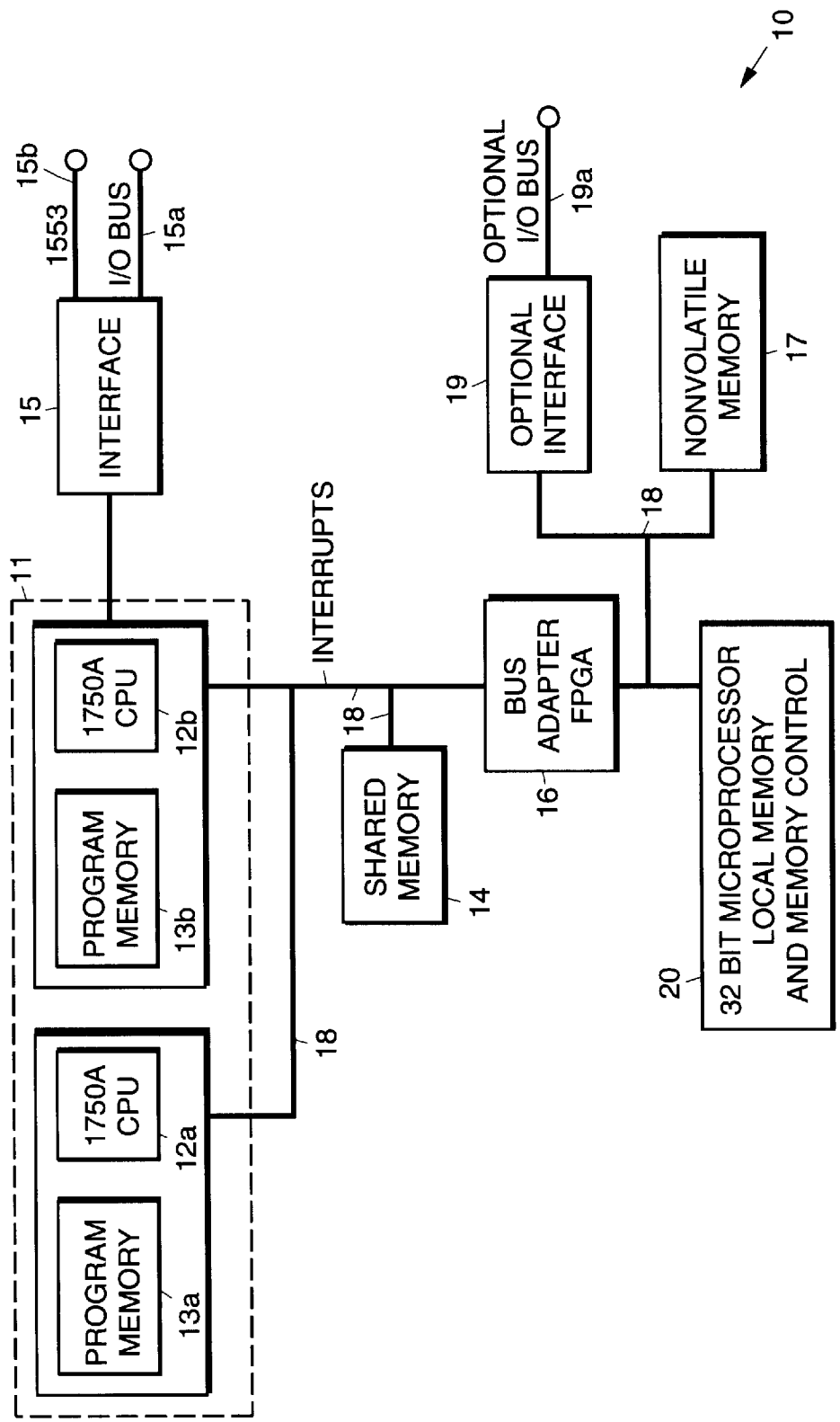
FIG. 1 illustrates an exemplary hybrid digital processing system in accordance with the principles of the present invention.

Referring to the drawing figures, FIG. 1 illustrates an exemplary hybrid digital processing system 10 in accordance with the principles of the present invention. The hybrid digital processing system 10 is shown as a functional block diagram that contains a DoD-STD 1750A processor 11 (or legacy processor 11) containing dual central processing units (CPUs) 12a, 12b and dual program memories 13a, 13b, although only one central processing unit 12 and memory 13 are required, and an advanced 32-bit processor 20. The processors 11, 20 share an operand memory 14 over a local bus 18, allowing tightly-coupled functions to operate on the processors 11, 20. An interface 15 is provided as part of the DoD-STD 1750A processor 11 that couples the dual central processing units 12a, 12b to an external input/output (I/O) bus 15a and MIL-STD-1553 bus 15b. A nonvolatile memory 17 is also provided that is coupled to the processors 11, 20 by way of the local bus 18. The nonvolatile memory 17 is used to store software code that is loaded during a boot up phase of the hybrid digital processing system 10. An optional external input/output (I/O) bus 19a may be used to provide a direct input/output path for the processor 20 via its local bus 18 and an optional interface 19.

The hybrid digital processing system 10 takes advantage of the memory bus protocol of the DoD-STD 1750A processor 11 to allow occasional access to the operand memory 14 by the 32-bit processor 20. This, in effect, creates a multi-ported memory 14 that is implemented using a relatively inexpensive interface circuit 16, such as a field programmable gate array 16, that interfaces the advanced processor 20 and the 1750A processor 11 to the operand memory 14 without requiring changes to the design of the 1750A processor 11. By allowing the 32-bit processor 20 to access the operand memory 14 only on cycles when the central processing units 12a, 12b of the 1750A processor 11 are not accessing the memory 14, microtiming changes in the execution environment of legacy software 23 (FIG. 2) running on the central processing units 12a, 12b of the 1750A processor 11 are minimized or eliminated.

Many 16-bit computers or processors have memory bus protocols similar to that of the 1750A processor 11, and therefore the technique of providing tight coupling through the use of a dual-ported operand memory 14 is readily applicable to a significant number of subsystems that may be upgraded.

The operand memory 14 that is shared by processors 11, 20 provides a physical mechanism in which shared variables 24 are accessible to legacy and new application software 23, 25 (FIG. 2) executing on both processors 11, 20. However, it is also necessary to provide a software architecture 30 (FIG. 2) that permits the shared variables to be accessed by the application software 23, 25 executing on the processors 11, 20 and that accounts for differences in the instruction set architectures of the two processors 11, 20. For example, the difference between big endian versus little endian representations, or the differences between the 1750A floating point format and the IEEE-754 floating point format are typical of the differences in the instruction set architectures. Moreover, the assigned addresses for shared operands 24 in the operand memory 14 need to be known by the application software 23, 25 executing in both processors 11, 20. These addresses would typically be assigned by the software tools which compile and link the application software 23 running on the legacy processor 11, but then the application software 25 running on the 32-bit processor 20 would need a capability to enable it to determine what those addresses are. Consequently, a mechanism is needed to facilitate sharing of variables in the operand memory 14 by the application software 23, 25 running on both processors 11, 20.

Figure 2:
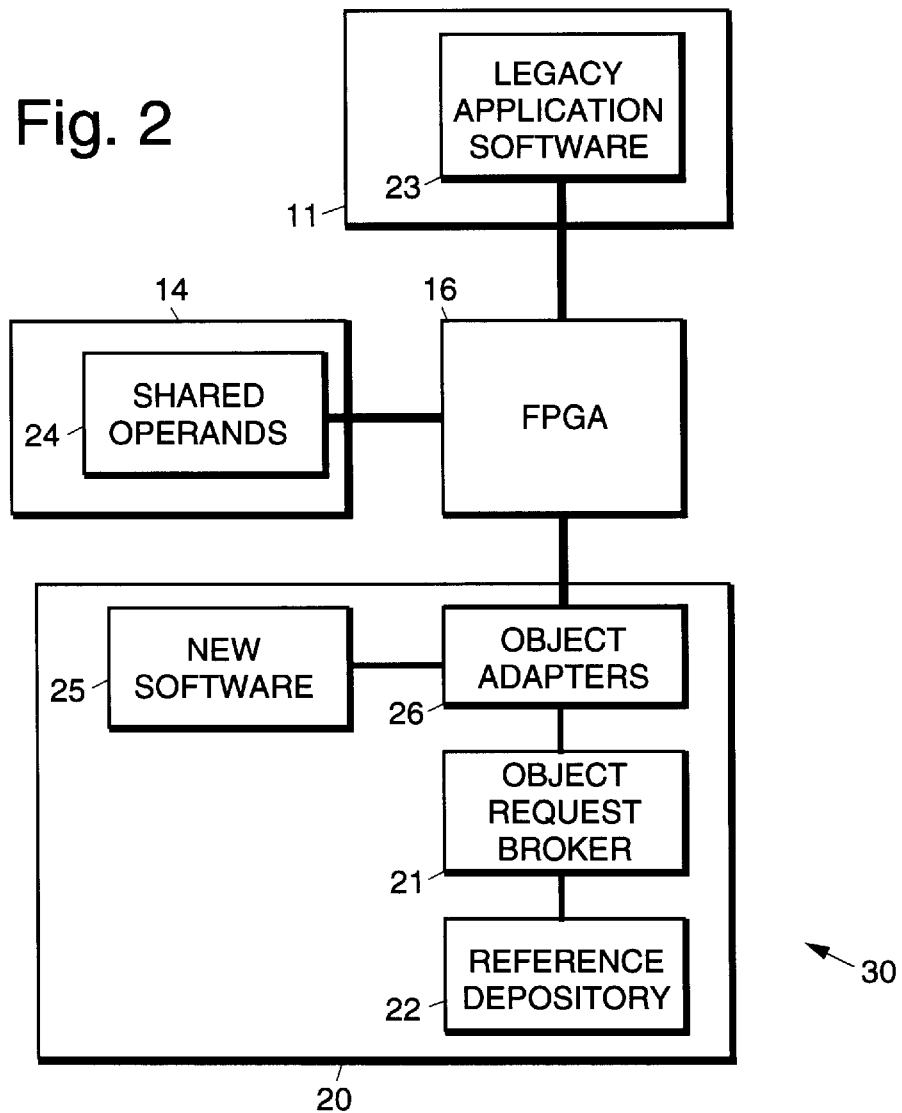
FIG. 2 is a diagram illustrating the software architecture of the hybrid digital processing system of FIG. 1.

Referring now to FIG. 2, it is a diagram illustrating the software architecture 30 of the hybrid digital processing system of FIG. 1. To implement the required software architecture 30, shared variables 24 or shared operands 24 are declared in the respective programming languages used on each of the processors 11, 20 and the shared variables 24 have separate representations in the instruction set architectures of the respective processors 11, 20. To minimize software revalidation issues, the approach used in the hybrid digital processing system 10 is as follows.

Shared variables or operands 24 are stored in the operand memory 14 using a native representation of the instruction set architecture of the legacy processor 11. However, these shared variables or operands 24 are typically incompatible with the instruction set architecture of the 32-bit processor 20. The hybrid digital processing system 10 solves this problem by using a real-time object request broker 21 that runs on the 32-bit processor 20.

The software architecture 30 of the hybrid digital processing system 10 employs a reference repository 22 within the local memory of the 32-bit processor 20 that contains object descriptor information. The information contained in the reference repository 22 is accessed when the following sequence of events occurs. Application software 25 executing on the 32-bit processor 20 reaches a point where it needs to access a shared operand 24 in the shared memory 14. The application software 25 invokes an object adapter 26 for the type of operand being accessed. The object adapter 26 determines what information it needs regarding the location and format of the shared operand 24, and it then proceeds to invoke the object request broker 21 in order to obtain that information from the reference repository 22 where all such information resides. Once the object adapter 26 has obtained the needed information, it can proceed to locate the shared operand 24 in the shared memory 14 and can apply any required format conversions to the shared operand 24 as it is being fetched from or stored into the shared memory, thus satisfying the request of the application software 25 which then continues its execution.

The legacy shared operand 24 implementation is thus hidden from the upgraded or new application software 25. Only knowledge of the interface specification of the shared operand 24 is required. As legacy software 23 is migrated to the new language, object (operand 24) implementations change, but do not affect the previously migrated code as long as the interface specification is maintained.

The present software architecture 30, in effect, creates a wrapper around the existing legacy software 23. The object request broker 21 manages the wrapper to insure a consistent object interface to the shared memory 14.

The implementation of the present invention may be generalized with the addition of a symmetrical object request broker (not shown) that is used by the legacy software 23. Shared objects (variables or operands 24) may then be stored in the operand memory 14 in the native format of either instruction set architecture. However this additional complexity is not required for most upgraded avionics systems. This generalization may be useful in some applications, but only a single object request broker 21 is to be used in an initial reduced to practice embodiment of the hybrid digital processing system 10.

The present invention also provides for methods 40 for use with a computer system 10 containing first and second processors 11, 20 that run software 23, 25 that use different instruction sets. FIG. 3 is a flow diagram illustrating methods 40 that permit access to shared operands by software running on different processors 11, 20. The methods 40 permit access to shared operands 24 by the software 23, 25 that runs on both processors 11, 20. One method 40 includes the following steps.

Shared operands 24 are stored 41 in an operand memory 14 using a native representation of an instruction set architecture of the first processor 11. A reference depository 22 is stored 42 in the second processor 20 that contains information regarding the location and format of the shared operands 24 in the operand memory 14. An object request broker 21 is disposed 43 on the second processor 20 to provide an interface between the software 25 that runs on the second processor 20 and the reference depository 22. Then, when a shared operand 24 is required by the software 25 running on the second processor 20, the software 25 is caused 44 to invoke an object adapter 26 for the type of operand being accessed, which in turn invokes the object request broker 21 in order to obtain information from the reference repository 22 enabling the object adapter 26 to locate and reformat the shared operand 24 in the shared memory 14. This action returns the requested shared operand 24 from the operand memory 14 for use by the software 25.

This methodology may be extended for use by both processors 11, 20. To achieve this, shared operands 24 are stored 45 in an operand memory 14 using a native representation of an instruction set architecture of the second processor 20. A second reference repository (not shown) is disposed 46 in the first processor 11 that contains information regarding the location and format of the shared operands 24 in the operand memory 14. A second object request broker (not shown) is disposed 47 on the first processor 11 to provide an interface between the software 23 that runs on the first processor 11 and the second reference depository. When a shared operand 24 is required by the software 23 running on the first processor 11, the software 23 is caused 48 to invoke an object adapter (not shown) for the type of operand being accessed, which in turn invokes the second object request broker in order to obtain information from the second reference repository enabling the object adapter to locate and reformat the shared operand 24 in the shared memory 14. This action returns the requested shared operand 24 from the operand memory 14 for use by the software 23.

Thus, a hybrid digital processing system and method that may be used to execute incrementally upgraded software has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Computer apparatus comprising:

a first processor comprising legacy software implemented using a native instruction set of a first instruction set architecture;

a second processor comprising new software implemented using a second instruction set architecture having an extended instruction set;

an operand memory coupled to the first processor and second processor by way of a local bus, that stores shared operands using a native representation of an instruction set architecture of the first processor;

an interface circuit coupled to the local bus that interfaces the second processor and the first processor to the operand memory;

and wherein the second processor further comprises an object adapter, an object request broker and a reference repository that contains information regarding the location and format of the shared operands in the operand memory, and wherein the object adapter is called by the new software when access to a shared operand is required by the new software, and wherein the object adapter by way of the object request broker accesses the reference repository to obtain information which allows the object adapter to provide access to the corresponding shared operand in the operand memory.

2. The apparatus of claim 1 wherein the first processor comprises a second object adapter, a second object request broker and reference depository that contains information regarding the location and format of the shared operands in the operand memory, and wherein the second object adapter is called by the legacy software when access to a shared operand is required by the legacy software, and wherein the second object adapter by way of the second object request broker accesses the second reference repository to obtain information which allows the second object adapter to provide access to the corresponding shared operand from the operand memory.

3. A method for use with a computer system containing first and second processors that run software that use different instruction sets, which method permits access to shared operands by the software that runs on both processors, said method comprising the steps of:

storing shared operands in an operand memory using a native representation of an instruction set architecture of the first processor;

storing a reference repository in the second processor that contains information regarding the location and format of the shared operands in the operand memory;

providing an object request broker on the second processor to provide an interface between the software that runs on the second processor and the reference repository; and when access to a shared operand is required by the software that runs on the second processor, causing the software to access an appropriate object adapter which in turn uses the object request broker to access information stored in the reference repository corresponding to the requested shared operand, which results in the successful accessing of the requested shared operand from the operand memory for use by the software.

4. The method of claim 3 which further comprises the steps of:

storing shared operands in an operand memory using a native representation of an instruction set architecture of the second processor;

storing a second reference repository in the first processor that contains information regarding the location and format of the shared operands in the operand memory;

providing a second object request broker on the first processor to provide an interface between the software that runs on the first processor and the second reference repository; and when access to a shared operand is required by the software that runs on the first processor, causing the software to access an appropriate object adapter which in turn uses the second object request broker to access information stored in the second reference repository corresponding to the requested shared operand, which results in the successful accessing of the requested shared operand from the operand memory 14 for use by the software.

* * * * *